United States Patent [19]
Burgess

[11] Patent Number: 5,805,896
[45] Date of Patent: Sep. 8, 1998

[54] SYSTEM FOR WRITING MAIN MEMORY ADDRESS OF OBJECT TO SECONDARY STORAGE WHEN STORING OBJECT AND READING MAIN MEMORY ADDRESS OF OBJECT WHEN RETRIEVING OBJECT FROM SECONDARY STORAGE

[75] Inventor: Henry W. Burgess, Woodinville, Wash.

[73] Assignee: Microsoft Corporation, Redmond, Wash.

[21] Appl. No.: 756,540

[22] Filed: Nov. 25, 1996

Related U.S. Application Data

[60] Continuation of Ser. No. 478,500, Jun. 7, 1995, abandoned, which is a division of Ser. No. 153,362, Nov. 16, 1993.

[51] Int. Cl.[6] ............................. G06F 12/08; G06F 15/82
[52] U.S. Cl. ......................... 395/710; 395/701; 395/705; 395/800
[58] Field of Search .................... 395/701, 705, 395/600, 710, 650, 800

[56] References Cited

U.S. PATENT DOCUMENTS

| | | | |
|---|---|---|---|
| 4,014,005 | 3/1977 | Fox et al. ............................. | 340/172.5 |
| 4,754,395 | 6/1988 | Weisshaar et al. ..................... | 364/200 |
| 4,872,167 | 10/1989 | Maezawa et al. ....................... | 371/19 |
| 4,885,717 | 12/1989 | Beck et al. ............................ | 364/900 |
| 5,003,460 | 3/1991 | Flueter et al. ......................... | 364/200 |
| 5,005,119 | 4/1991 | Rumbaugh et al. ..................... | 364/200 |
| 5,021,976 | 6/1991 | Wexelblat et al. ..................... | 364/521 |
| 5,051,898 | 9/1991 | Wright et al. .......................... | 364/200 |
| 5,095,522 | 3/1992 | Fujita et al. ........................... | 395/200 |
| 5,136,716 | 8/1992 | Harvey et al. ......................... | 395/800 |
| 5,142,622 | 8/1992 | Owens .................................. | 395/200 |
| 5,163,130 | 11/1992 | Hullot ................................... | 395/148 |
| 5,179,550 | 1/1993 | Simpson ............................... | 370/54 |
| 5,283,898 | 2/1994 | Kusumoto et al. ..................... | 395/650 |
| 5,287,537 | 2/1994 | Newmark et al. ...................... | 395/800 |
| 5,295,256 | 3/1994 | Bapat .................................... | 395/500 |
| 5,303,379 | 4/1994 | Khoyi et al. ........................... | 395/700 |
| 5,305,461 | 4/1994 | Feigenbaum et al. .................. | 395/775 |
| 5,339,430 | 8/1994 | Lundin et al. ......................... | 395/700 |
| 5,341,478 | 8/1994 | Travis, Jr. et al. ..................... | 395/200 |
| 5,386,568 | 1/1995 | Wold et al. ............................ | 395/700 |
| 5,404,534 | 4/1995 | Foss et al. ............................. | 395/700 |
| 5,421,019 | 5/1995 | Conner et al. ......................... | 395/700 |
| 5,426,747 | 6/1995 | Weinreb et al. ....................... | 395/400 |
| 5,448,736 | 9/1995 | Yuasa et al. ........................... | 395/700 |
| 5,455,952 | 10/1995 | Gjovaag ................................ | 395/700 |
| 5,551,035 | 8/1996 | Arnold et al. ......................... | 395/650 |

OTHER PUBLICATIONS

Hirakawa et al., "A Generic Model for Constructing visual Programming Systems," *IEEE*:124–129, 1989.

Hirakawa et al., "An Inconic Programming System, Hi-Visual," *IEEE Transactions on software Engineering*:16(10):1178–1184, 1990.

Hirakawa and Ichikawa, "Advances in Visual Programming," *IEEE*:538–543, 1992.

(List continued on next page.)

*Primary Examiner*—Thomas C. Lee
*Assistant Examiner*—Rehana Perveen
*Attorney, Agent, or Firm*—Seed and Berry LLP

[57] ABSTRACT

A method and system for interconnecting software components. In a preferred embodiment, the present invention instantiates an event object. The event object includes message information describing the message and a dispatching member function for invoking a member function of a target object passing the message information. A message is passed by invoking the dispatching member function of the event object passing an identifier to a target object and an identifier of a member function of the target object. The dispatching member function invokes the identified member function of the identified target object passing the event information as an actual parameter. The event object is preferably of a derived class that inherits a base class. The base class provides common event behavior, while the derived class provides behavior specific to a type of message.

7 Claims, 9 Drawing Sheets

OTHER PUBLICATIONS

"Drag–Drop Technique for Connecting Source and Target Objects in a Application Builder Environment," *IBM Technical Disclosure Bulletin,* vol. 36, No. 8, Aug. 1993, New York, pp. 365–366.

"COOP–An Object Oriented Framework for Systems Integration," Arne–Jørgen Berre, *ICSI '92 Proceedings, 2nd International Conference on Systems Integration,* Jun. 1992, New Jersey, pp. 104–113.

Ingalls, D. et al., Fabrik –*A Visual Programming Environment,* OOPSLA '88 Conference Proceedings, Sep. 25–30, 1988, pp. 176–190.

| Source | | Target | |
| --- | --- | --- | --- |
| Component | Port | Component | Port |
| FScrollBar | Out1 | FDisplay | In1 |
| FScrollBar | Out1 | F to C | In1 |
| F to C | Out1 | CScrollBar | In1 |
| CScrollBar | Out1 | CDisplay | In1 |
| CScrollBar | Out1 | C to F | In1 |
| C to F | Out1 | FScrollBar | In1 |

*FIG. 6*

SYSTEM FOR WRITING MAIN MEMORY ADDRESS OF OBJECT TO SECONDARY STORAGE WHEN STORING OBJECT AND READING MAIN MEMORY ADDRESS OF OBJECT WHEN RETRIEVING OBJECT FROM SECONDARY STORAGE

CROSS-REFERENCE TO RELATED APPLICATIONS

This application is a continuation of U.S. Pat. application No. 08/478,500, filed Jun. 7, 1995, now abandoned, which was a divisional application of 08/153,362 (now pending allowance), filed Nov. 16, 1993.

TECHNICAL FIELD

The present invention relates generally to a computer system for visual programming, and more specifically, to a method and system for interconnecting visual components and passing messages between connected components.

BACKGROUND OF THE INVENTION

Visual programming is a computer programming technique that allows for rapid development of visually oriented programs (visual programs). FIG. 1 is a diagram illustrating a sample operation of a visual program. The visual program is a temperature converter, which converts Fahrenheit to Centigrade, and vice versa. The Fahrenheit scroll bar 101 is used to set the Fahrenheit value to between 0 and 100 degrees as indicated by the position of the Fahrenheit slider 103. The Fahrenheit display 102 displays the numeric Fahrenheit value represented by the position of the Fahrenheit slider. The Centigrade scroll bar 111 is used to set the Centigrade value between 0 and 100 degrees as indicated by the Centigrade slider 113. The Centigrade display 112 displays the numeric Centigrade value represented by the position of the Centigrade slider. In operation, when the Fahrenheit slider is moved by a user, the Centigrade slider is automatically moved to the corresponding Centigrade position and the Fahrenheit and Centigrade displays are updated. Conversely, when the Centigrade slider is moved by a user, the Fahrenheit slider is automatically moved to the corresponding Fahrenheit position and the Centigrade and Fahrenheit displays are updated.

Visual programming allows various components (e.g., a scroll bar) to be interconnected visually to effect the program behavior. A visual programming environment typically includes a list of predefined components that can be interconnected to create a visual program. Each component may include input and output ports and a visual interface. When creating a visual program, a programmer specifies the visual components and their location on the display. The programmer also specifies the interconnection between various ports. The components pass values through these connections. FIG. 2 is a block diagram illustrating a scroll bar component. The scroll bar component 201 receives messages from the operating system (e.g., mouse down) and controls the display of a scroll bar. The scroll bar also provides an input port 203 and an output port 202. The input port is used to receive a value indicating a new position of the slider and the output port is used to send a value indicating a new slider position. The scroll bar can be connected to other components through its ports.

FIG. 3 is a diagram illustrating a scroll bar connected to a display component. A display component 301 has one input port 303 for receiving a value. The display component controls the displaying of the value that it receives. The output port 202 of the scroll bar component 201 is connected to the input port 303 of the display component. In operation, whenever the scroll bar slider is moved, a value indicating the new position of the slider is sent from the scroll bar component to the display component. The display component receives this value and updates its display accordingly.

Although prior references have described general visual programming environments, visual programming is not widespread because of the inefficiencies of visual programs. For example, visual programs often execute in an interpretive mode that results in unacceptably slow performance.

SUMMARY OF THE INVENTION

It is an object of the present invention to provide a method and system that allows for creation of efficient visual programs.

It is another object of the present invention to provide a method and system that shields component developer from the details of the connecting of components and the passing of values between components.

These and other objects, which will become apparent as the invention is more fully described below, are obtained by an improved method and system for sending messages between components. In a preferred embodiment, the present invention instantiates an event object. The event object includes message information describing the message and a dispatching member function for invoking a member function of a target object passing the message information. A message is passed by invoking the dispatching member function of the event object passing an identifier to a target object and an identifier of a member function of the target object. The dispatching member function invokes the identified member function of the identified target object passing the event information as an actual parameter. The event object is preferably of a derived class that inherits a base class. The base class provides common event behavior, while the derived class provides behavior specific to a type of message.

BRIEF DESCRIPTION OF THE DRAWINGS

FIG. 6 is a table containing a listing of the connections for the for the temperature converter program.

DETAILED DESCRIPTION OF THE INVENTION

The present invention provides a method and system for connecting components and passing of messages (events) between components. In a preferred embodiment, each component may provide multiple input ports and output ports. Each output port sends a message corresponding to a particular type of event; each input port receives a message corresponding to a particular type of event. A component that sends a message is referred to as a source, and a component that receives the message is referred to as the target. In a preferred embodiment, each component has an associated run-time class and editor class. The editor class provides component-specific behavior to assist in creating a visual program. The run-time class provides the component behavior when the visual program executes. A visual programming system controls the development of visual programs by instantiating objects of the editor classes and controls the run-time execution by instantiating objects of the run-time class. As described below, the present invention provides a mechanism in which messages are efficiently passed between components. In the following, a preferred embodiment of the present invention is described using well-known object-oriented terminology and terminology of the C++ programming language.

Figure 1:
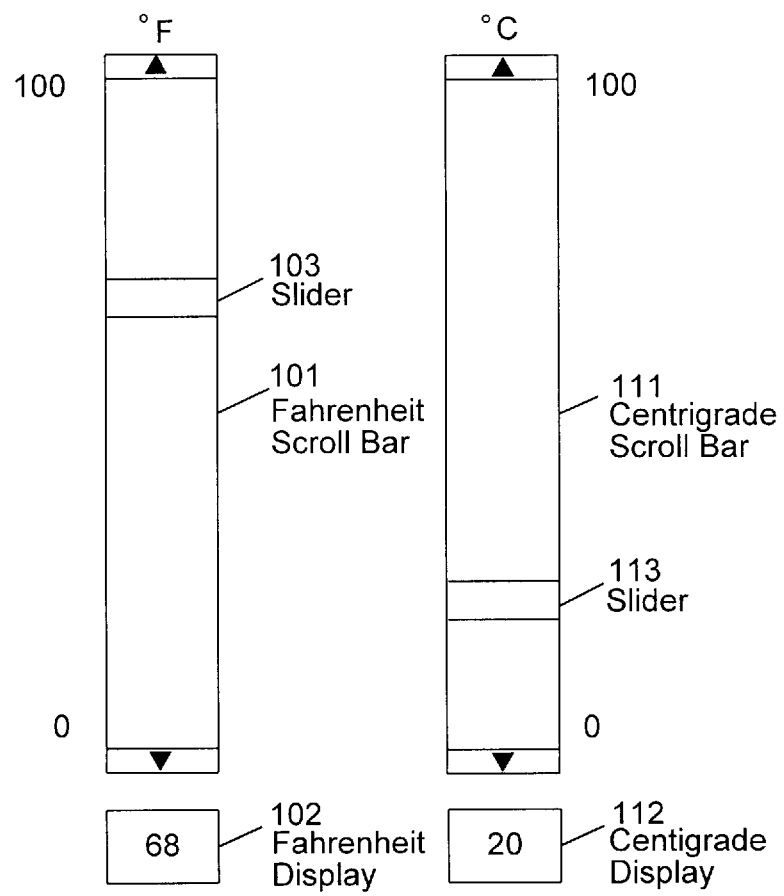
FIG. 1 is a diagram illustrating a sample operation of a visual program.
Figure 2:
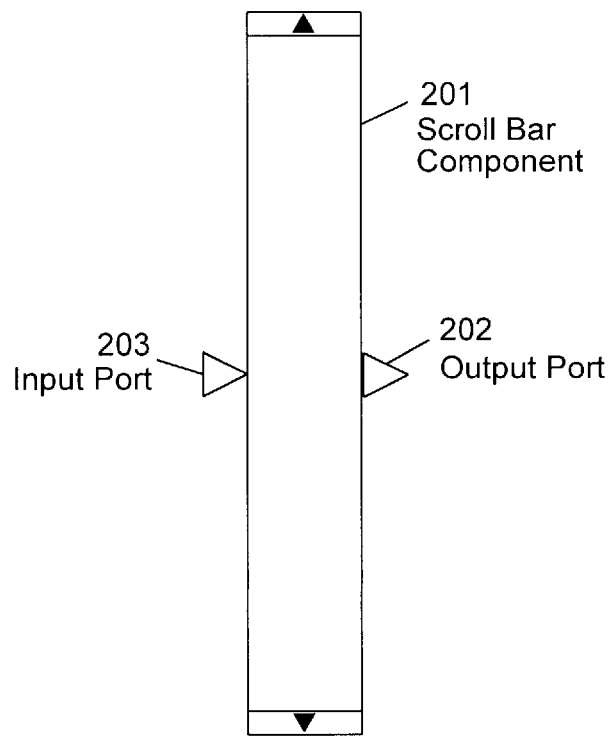
FIG. 2 is a block diagram illustrating a scroll bar component.
Figure 3:
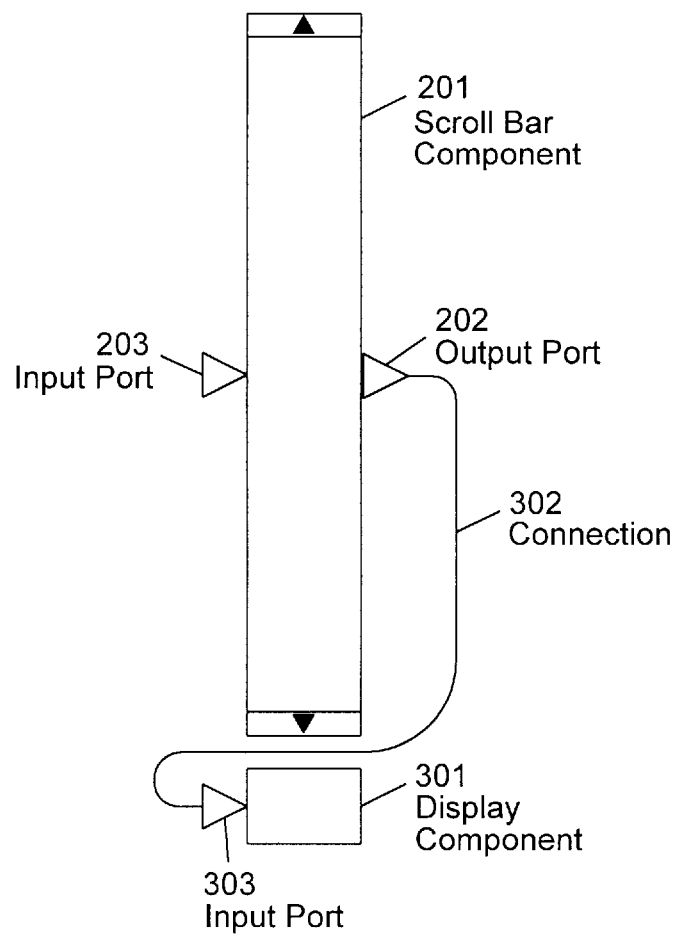
FIG. 3 is a diagram illustrating a scroll bar connected to a display component.
Figure 4:
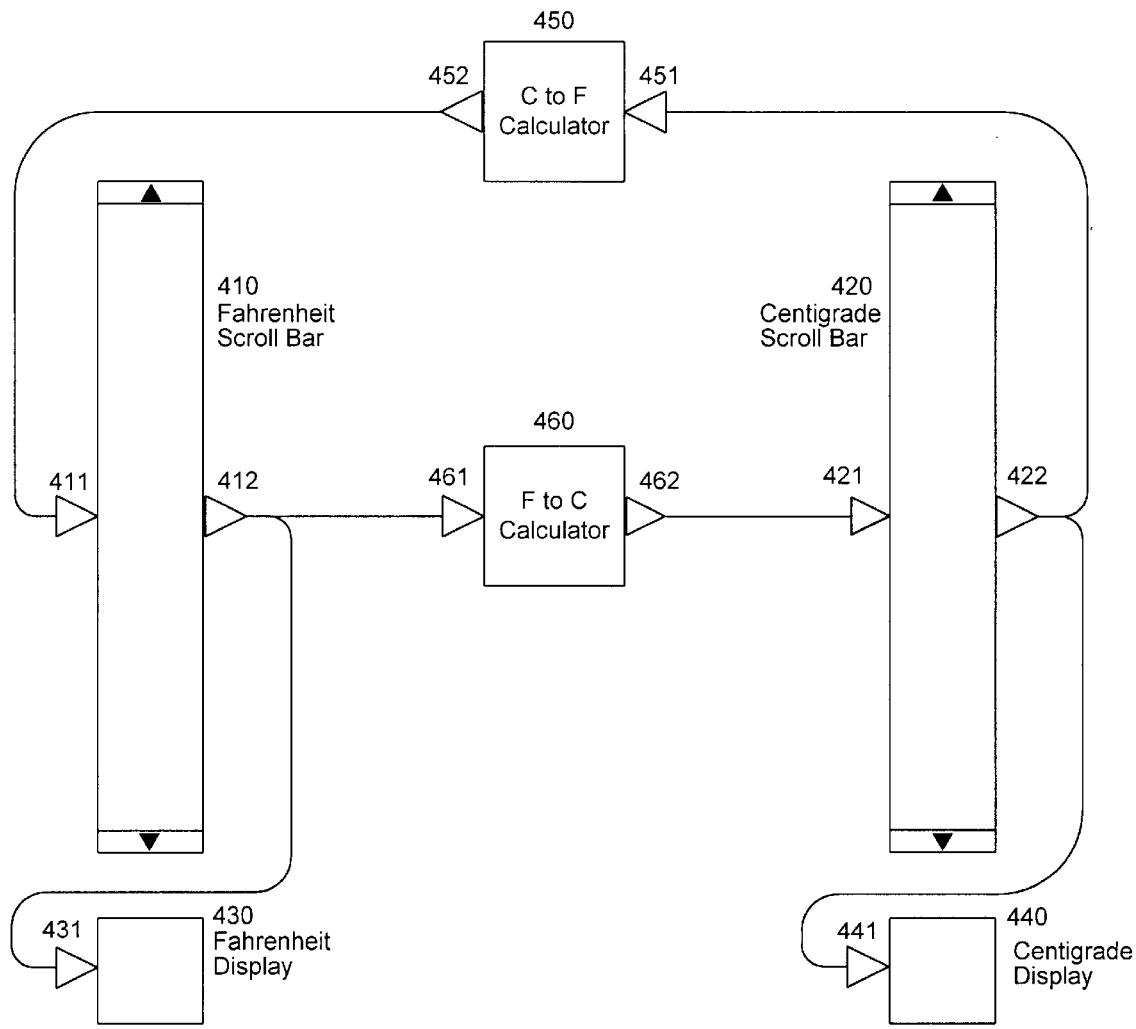
FIG. 4 is a diagram illustrating visual programming of the present invention.

FIG. 4 is a diagram illustrating visual programming of the present invention. To generate a visual program to implement a temperature converter, a programmer would position a Fahrenheit scroll bar 401, a Fahrenheit display 430, a Centigrade scroll bar 420, and a Centigrade display 440. The programmer would also position an FtoC calculator 460, which converts a Fahrenheit value to a Centigrade value, and a CtoF calculator 450, which converts a Centigrade value to a Fahrenheit value. In one embodiment, the components are selected from an extendible list of available components. The programmer then connects the components through their ports. The connections 412->461 and 412->431 indicate that when the Fahrenheit scroll bar is changed (e.g., slider moved), the new value is sent to the FtoC calculator and the Fahrenheit display. The connection 462->421 indicates that when the FtoC calculator calculates a new Centigrade value, the new value is sent to the Centigrade scroll bar. The connections 422->441 and 422->451 indicate that when the Centigrade scroll bar is changed, the new value is sent to the CtoF calculator and the Centigrade display. The connection 452->411 indicates that when the CtoF calculator calculates a new Fahrenheit value, the new value is sent to the Fahrenheit scroll bar. In one embodiment, the components are connected by entering a connect mode and selecting the source and target of each connection.

Figure 5:
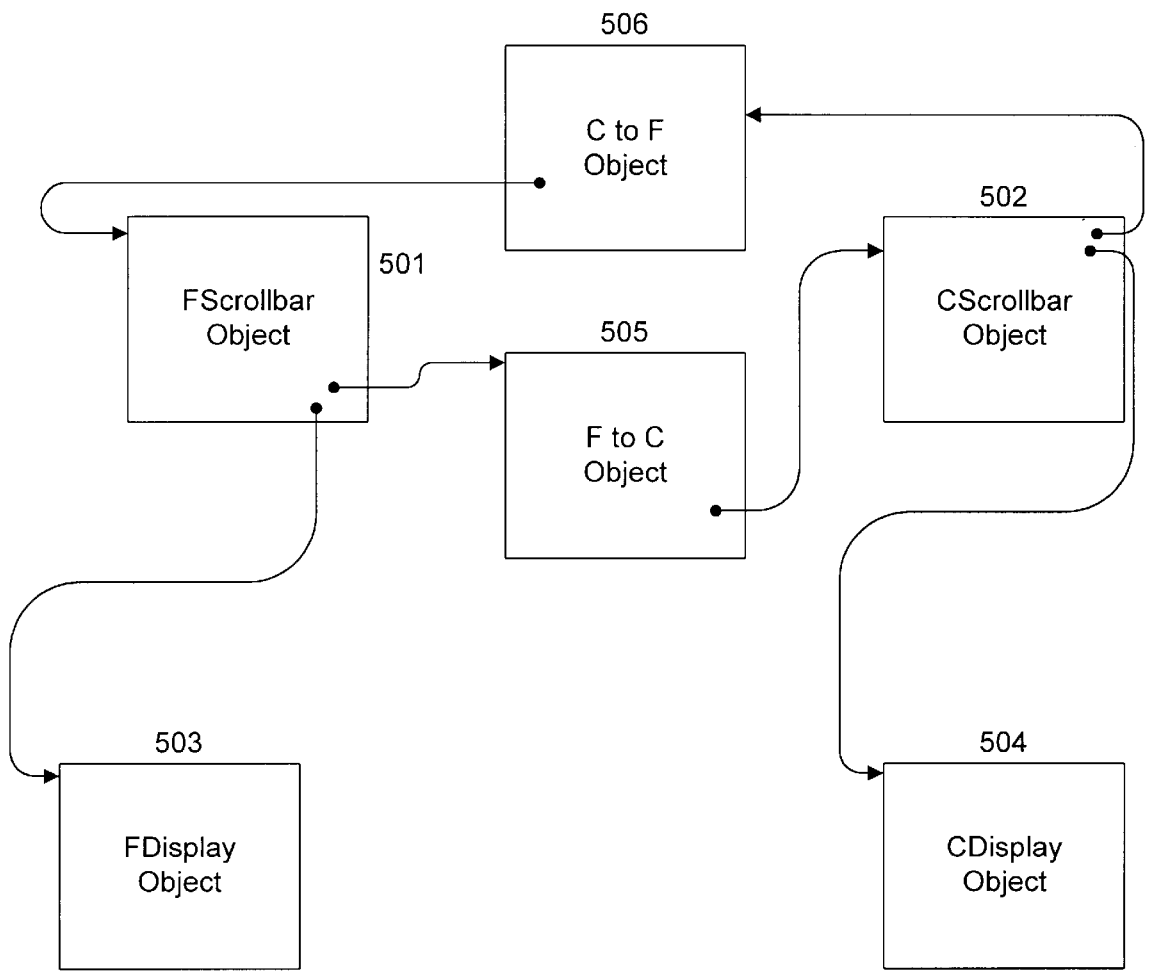
FIG. 5 is a diagram illustrating the instantiated objects for the temperature converter.

The visual programming system instantiates an object of the run-time class for each component selected by the programmer. FIG. 5 is a diagram illustrating the instantiated objects for the temperature converter. The FScrollbar object 501 corresponds to the Fahrenheit scroll bar component, the CScrollbar object 502 corresponds to the Centigrade scroll bar component, the FDisplay object 503 corresponds to the Fahrenheit display component, the CDisplay object 504 corresponds to the Centigrade display component, the FtoC object 505 corresponds to the FtoC calculator component, and the CtoF object 506 corresponds to the CtoF calculator component. Each of these objects implements the display and control of the corresponding component. The directed arcs indicate the direction of the connections, that is, from an output port to an input port.

Each component may send messages to other components corresponding to different types of events. For example, a scroll bar may send a message to indicate a changed value event has occurred and another message to indicate a scroll down has occurred. Each type of event has its own output port. Also, input ports are designated to receive only certain types of events. For example, an output port that sends messages relating to a scroll up event can only be connected to an input port that expects a message in the same format as a scroll up message.

A source object (corresponding to a source component) sends a message (communicates the occurrence of an event) by invoking a member function of a target object (corresponding to a target component). Each input and output port is preferably associated with a function member of the run-time object. For example, a scroll bar object may have a function member named ValueIn corresponding to an input port for receiving a new value and a function member named ValueOut corresponding to an output port for sending a new value. In operation, the member function ValueOut is invoked whenever a change in the value for the scroll bar occurs, e.g., when the slider is moved. The member function ValueOut invokes the target member function corresponding to each input port to which it is connected. The invoked target member function then processes the value information which is passed as a parameter.

In a preferred embodiment, message information (e.g., new value) is encapsulated in an object of an event class. The source member function corresponding to an output port creates an event object and stores the event information in the event object. The source member function effects the invocation of a notify member function of a target object passing the event object and a pointer to the target member function. The notify member function invokes a dispatching member function of the event object passing a pointer to the target object and a pointer to the target member function. The dispatching member function invokes the target member function passing the stored information as a parameter. In a preferred embodiment, different implementations of event objects are used to represent different function prototypes (parameter list) of target member functions. Each class of event object contains information that is passed to a target member function according to the function prototype. Thus, each source member function invokes target member functions with the same prototype.

In a preferred embodiment, each run-time class inherits the class CObject. The class CObject tracks the connections and controls the sending of messages. The class CObject is referred to as a connection manager. In this way, run-time classes that implement component behavior can be developed without detailed knowledge of the implementation of the class CObject. Moreover, run-time objects implemented by different developers can cooperatively interact. FIG. 6 is a table containing a listing of the connections for the for the temperature converter program. The class CObject includes an array (connectionArray) that contains the connections for each output port of the run-time object. Each entry of the connection array contains an identifier of the output port of the source object, an identifier of the target object, and an identifier of the input port of the target object. For example, the connection array for the FScrollbar object contains two entries:

(Out1, FDisplay, In1) and (Out1, FtoC, In1)

"Out1" identifies the output port, "FDisplay" and "FtoC" identify the target objects, and "In1" identifies the input port of the target objects. When an event occurs for a particular output port, the source object instantiates an event object and invokes an inform targets member function of the class CObject (connection manager) identifying the output port. The output port is preferably identified by a pointer to a member function (source member function) of the source object. The inform targets member function sends an appropriate message to each target object as indicated by the connection array for the source object. The input port is preferably identified by a pointer to a member function (target member function) of the target object. The connection manager sends the message to the target object by invoking a notify member function of the target object passing a pointer to the target member function and an event object. The event object contains actual parameters for the target member function. The notify member function invokes a dispatch member function of the event object passing a pointer to the target member function and a pointer to the target object. The dispatch member function formats the actual parameters and invokes the target member function of the target object passing the actual parameters.

Code Table 1 contains pseudocode for the class CObject.

CODE TABLE 1

```
class CONNECTION
{   CObject *ptarget;
    ULONG pmftarget;
    ULONG pmfsource;
} class CObject
{
    boolean              isRecursing;
    CONNECTION           connectionArray[10];
    int                  connectionCount;
    virtual    boolean   NotifyEvent (CEvent *pevent, CObject
                         *psource, ULONG pmftarget);
               boolean   InformTargets(CEvent *pevent, ULONG
                         pmfsource);
               void      AddTarget(CObject *ptarget,
                         ULONG pmftarget, ULONG
                         pmfsource);
    virtual    void      Serialize(CArchive &ar);
    virtual    VOID      WriteConnectionArray(CArchive
                         &ar);
    virtual    VOID      ReadConnectionArray(CArchive
                         &ar);
    virtual    VOID      SerializeObjectData(CArchive &ar);
};

BOOL CObject::NotifyEvent (CEvent *pevent, CObject *psource,
ULONG pmftarget)
{
    BOOL ret;
    if (isRecursing) return FALSE;
    isRecursing = TRUE;
    if (pevent -> IsKindOf(CValueEvent))
        ret ((CValueEvent*)pevent)->Dispatch(psource, this, pmftarget);
    else if
        .
        .
        .
    else return FALSE;
    isRecursing = FALSE;
    return ret;
}

BOOL CObject::InformTargets(CEvent *pevent, ULONG pmfsource)
{
    for (i = 0; i < connectionCount; i++)
    {
        if (connectionArray[i].pmfsource == pmfsource)
            connectionArray[i].pmftarget->NotifyEvent(pevent, this,
connectionArray[i].pmftarget);
    }
} void CObject::AddTarget(CObject *ptarget, ULONG pmftarget, ULONG
pmfsource)
{
    i = connectionCount++;
    connectionArray[i].ptarget = ptarget;
    connectionArray[i].pmftarget = pmftarget;
    connectionArray[i].pmfsource = pmfsource;
}
```

The programming system adds connections to a run-time object by invoking the member function AddTarget provided by the connection manager. The programming system invokes the AddTarget member function of the source object whenever a programmer connects two objects. The member function and AddTarget is passed a pointer to the target object, a pointer to the target member function (representing the input port), and a pointer to a source member function (representing the output port). The member function Add-Target adds an entry to the connectionArray of the source object corresponding to the passed parameters. In a preferred embodiment, the connections are stored not as data members of the CObject, but rather are stored in a heap that is shared by all run-time objects. In this way, the storage overhead for each object can be minimized.

A message is sent to a target object in the following manner. The source object instantiates an event object and stores event information in the event object. The source object invokes the member function InformTargets of its connection manager passing the event object and a pointer to the source member function. For each connection for that output port (source member function), the connection manager invokes the member function NotifyEvent of target object passing the event object, a pointer to the target member function, and a pointer to the source object. The member function NotifyEvent invokes the member function Dispatch of the event object passing a pointer to the source object, a pointer to the target object, and a pointer to the target member function. The member function Dispatch invokes the target member function of the target object passing the stored event information as actual parameters. An event object encapsulates the message information in a way that is transparent to the connection manager. Thus, the connection manager can control the invoking of target member functions passing arbitrary parameters.

Figure 7:
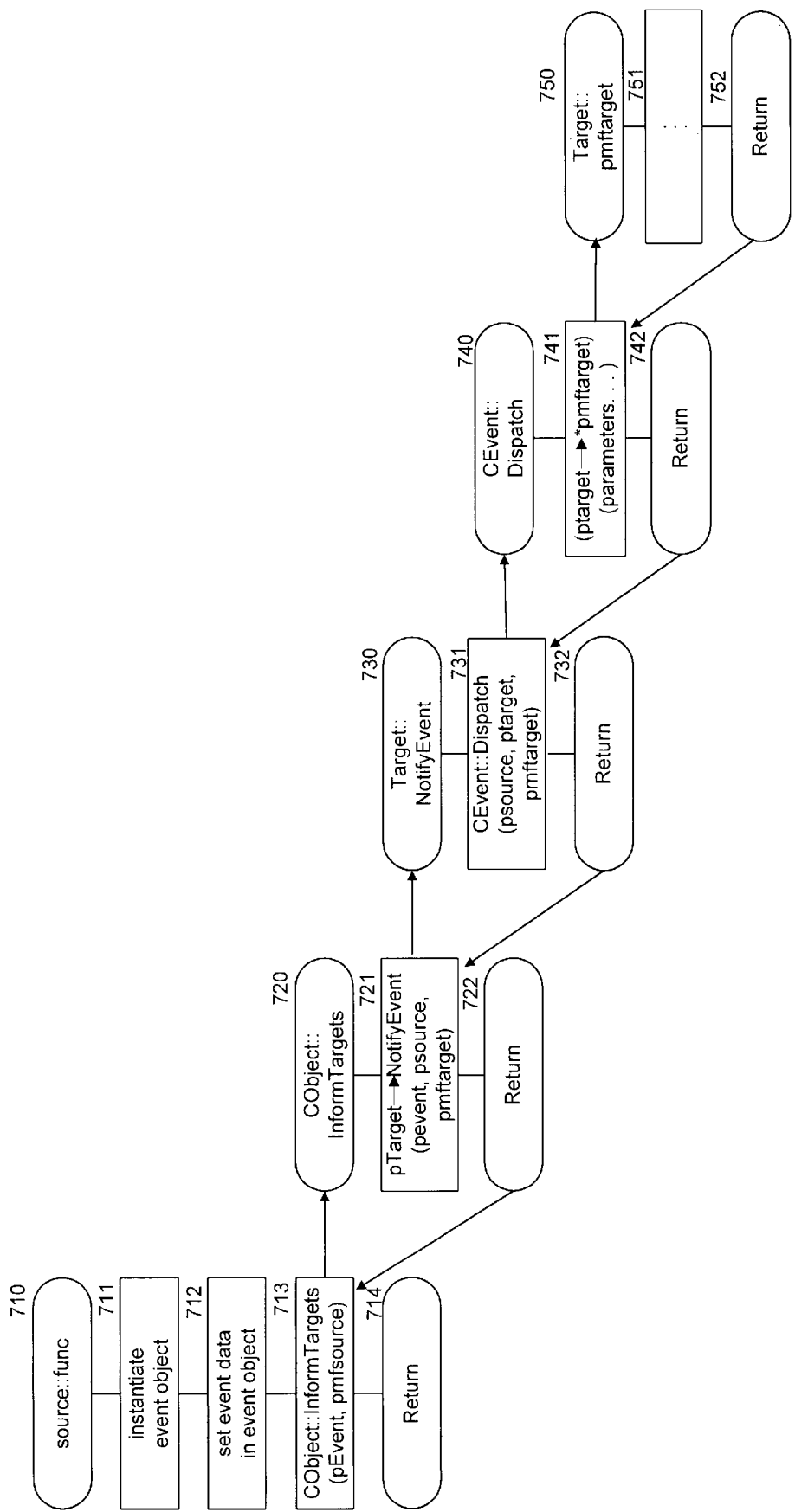
FIG. 7 is a flow diagram illustrating the flow of control of sending a message from a source object to a target object.

FIG. 7 is a flow diagram illustrating the flow of control of sending a message from a source object to a target object. A source member function 710–714 of the source object instantiates an event object in step 711. In step 712, the source member function stores the event information in the event object. In step 713, the source member function invokes the member function InformTargets of the connection manager passing a pointer to the event and the source member function. In step 721, the member function InformTargets loops determining which entries in the connection array correspond to the source member function. When an entry is found, the member function InformTargets invokes the member function NotifyEvent of the target object passing a pointer to the event, a pointer to the source object, and a pointer to the target member function. In step 731, the member function NotifyEvent of the target object invokes the member function Dispatch of the event passing a pointer to the source object, a pointer to the target object, and pointer to the target member function. In step 741, the member function Dispatch invokes the target member function passing the event information stored in the event object. The target member function processes the event information in step 751. The target member function then returns, which causes the member functions Dispatch, NotifyEvent, and InformTargets to return to the execution of the source member function.

The use of an event object allows the connection manager to invoke input member functions with arbitrary parameters. Each prototype for a input member function has its own implementation of the event class to handle the event. The source object instantiates the appropriate class of event object. For example, the input member function ValueIn is passed an integer. Thus, an event class is implemented that contains an integer data member to store the value. The member function Dispatch of the event class invokes a passed target member function passing the stored value. An event class may be implemented for each different prototype of a target member function. For example, if the event information includes both an integer and a string, then an event class can have a data member for the integer and another for the string. The member function Dispatch of the event class invokes a passed target member function passing the integer and the string as parameters.

Code Table 2 contains pseudocode that describes the event classes. Each event class derives from the class CEvent. The event class CIntEvent is used to pass information stored as an integer to a target member function. The member function Dispatch is passed a pointer the target object and a pointer to the member function. The member function Dispatch invokes the target member function by the following statement:

(ptarget->*(LongToMember(pmftarget))) (numValue)

The event class CActionEvent is used to pass messages with no corresponding data, and the event class CStringEvent is used to pass messages with string data.

```
class CEvent
{
public:
  CEvent();
  virtual BOOL Dispatch (CObject *psource, CObject *ptarget,
    ULONG pmftarget)=0;
} class CActionEvent : public CEvent
{
public:
  virtual BOOL Dispatch (CObject *psource, CObject *ptarget,
    ULONG pmftarget)
  {(ptarget->*(LongToMember(pmf)))()};
} class CIntEvent : public CEvent
{
public:

INT         numValue;

virtual BOOL Dispatch (CObject*psource, CObject *ptarget,
    ULONG pmftarget)
  {(target->*(LongToMember(pmftarget)))(numValue)};
} class CStringEvent : public CEvent
{
public:
  STRING      stringValue;

virtual BOOL Dispatch (CObject *psource, CObject *ptarget, ULONG
    pmftarget);
  {(ptarget->*(LongToMember(pmftarget)))(stringValue)};
}
```

Code Table 3 contains pseudocode for a sample scroll bar object corresponding to a scroll bar component. The scroll bar object is defined by class CScrollbar, which inherits the connection manager (class CObject). The class contains data members to store the current value of the scroll bar, a large and small increment for the scroll bar, and the minimum and maximum values for the scroll bar. The class also contains the member function to set and retrieve the current value, to receive messages from the parent window of that scroll bar, and to effect various scroll bar behaviors. The scroll bar component has an input function member (value) with one parameter and an output function member (value) with no parameters.

The constructor CScrollbar registers the scroll bar with the operating system and initializes its data members. The member function HandleParentMsg receives messages from the parent window and dispatches the message. For example, if the member function HandleParentMsg is passed a message that the scroll bar event line up (SB LINEUP) has occurred, then the member function invokes the member function LineUp. The member function LineUp instantiates a CActionEvent object, sets a pointer to the member function LineUp, and invokes the member function InformTargets of the connection manager. The member function LineUp then invokes the member function value passing a new value for the scroll bar.

The member function value receives the new value. If the new value is different than the current value, then the member function adjusts the slider, instantiates a CIntEvent object, sets the event object to the new value, sets a pointer to the member function value (to identify the source member function), and invokes the member function InformTargets of the connection manager.

The member function minimum illustrates a member function of an object that does not cause a message to be sent to target objects, that is, it does not correspond to an output port. The member function minimum, however, may correspond to an input port. In one embodiment, a member function could correspond to both an input and an output port (a bidirectional port). The member function can be invoked to receive a message and then send a message to other target objects.

In a preferred embodiment, the present invention is implemented to execute under the Windows operating system developed by Microsoft Corporation. The Windows operating system is described in "Programming Windows" written by Charles Petzold and published by *Microsoft Corporation,* which is hereby incorporated by reference.

CODE TABLE 3

```
class CScrollbar : CObject, CWindow
{
  INT         m_largeChange;
  INT         m_smallChange;
  INT         m_value;
  INT         m_minimum;
  INT         m_maximum;
  BOOL        m_isVert;

CScrollBar();
              CScrollBar(const VRect &pos, CWindow *parent,
              boolean isVert);
  virtual INT    largeChange();
  virtual VOID   largeChange(INT);

virtual INT    smallChang();
  virtual VOID   smallChange(INT);

virtual INT    value();
  virtual VOID   value(INT);

virtual INT    minimum();
  virtual VOID   minimum(INT);

virtual INT    maximum();
  virtual VOID   maximum(INT);

virtual VOID   lineUP();
  virtual VOID   lineDown();

virtual VOID   pageUP();
  virtual VOID   pageDown();

virtual LONG   HandleParentMsg(HWND hwnd, unsigned wm,
                   WORD wParam, LONG
  lParam);

}

CScrollBar::CScrollBar(const VRect &pos, CWindow *parent,
```

CODE TABLE 3-continued

```
BOOL isVert)

DWORD style;
  if (isVert)
     style = WS_CHILD | SBS_VERT;
  else
     style = WS_CHILD | SBS_HORZ;

m_isVert = isVert;
  CWinWindow::Init( parent,
                    NULL,
                    0L,
                    "SCROLLBAR",
                    "",
                    style,
                    pos.left,
                    pos.top,
                    pos.right - pos.left,
                    pos.bottom - pos.top,
                    NULL,
                    NULL);

smallChange(1);
  largeChange(10);
  minimum(0);
  maximum(100);
  value(0);
}

VOID      CScrollBar::lineUp()
{
          CActionEvent evt;
          VOID (ScrollBar::*mfp)() = &CScrollBar::lineUp;
          InformTarget(&evt, MemberToLong(mfp));
          value(m_value-m_smallChange);
}

VOID      CScrollBar::value(INT theValue)
{
          if (theValue < m_minimum)
             theValue = m_minimum;
          if (theValue > m_maximum)
             theValue = m_maximum;

if (m_value != theValue)
          {
             m value = theValue;
             if (m_hwnd != NULL)
                SetScrollPos(GetHwnd(), SB_CTL, m_value,
                   TRUE);
             CIntValue numEvent;
             INT (CScrollBar::*mfp)() = &CScrollBar::value;
             numEvent.numValue = m_value;
             InformTargets(&numEvent,
                (ULONG)MemberToLong(mfp));
          }
}
}
VOID      CScrollBar::minimum(INT theMinimum)
{
  m_minimum = theMinimum;
  if (m_hwnd != NULL)
     SetScrollRange(GetHwnd(), SB_CTL, m_minimum, m_maximum,
        TRUE);
  if (m_value < the Minimum)
     value(theMinimum);
}

LONG ScrollBar::HandleParentMsg(    HWND hwnd,
  unsigned    wm,
  WORD wParam,
  LONG        lParam)
{
  switch(wm)
  {
    case WM_HSCROLL:
    case WM_VSCROLL:
    switch(wParam)
    {
       case SB_LINEUP:             lineUp(); break;
```

CODE TABLE 3-continued

```
       case SB_LINEDOWN:           lineDown(); break;
       case SB_PAGEUP:             pageUp(); break;
       case SB_PAGEDOWN:           pageDown(); break;
       case SB_TOP:                value(minimum()); break;
       case SB_BOTTOM:             value(maximum()); break;
       case SB_THUMBTRACK:
       case SB_THUMBPOSITION:      value(LOWORD(lParam));
                                   break;
       case SB_ENDSCROLL:          break;
    }
    default: break;
  }
  return CWinWindow::HandleParentMSG(hwnd, wm, wParam, lParam);
}
```

In a preferred embodiment, the programming system persistently stores the run-time objects of a visual program. The programming system maintains a pointer to each run-time object corresponding to a component. To store the program, the programming environment invokes a member function Serialize (provided by the connection manager of each object). The member function Serialize writes the connection array to the persistent storage and invokes the member function SerializeObjectData to write the object specific data to the persistent storage. The member function SerializeObjectData of the connection manager would typically be overridden by the run-time object corresponding to the component. For example, the member function SerializeObjectData for the scroll bar object writes each data member to persistent storage. Similarly, each object has corresponding member functions to retrieve the persistent stored data. When storing and retrieving data, the programming system needs to map the memory address of each pointer to its persistently stored object data. When the object data is retrieved, the pointers in the connection array need to be mapped to their new memory locations.

In a preferred embodiment, each component has a corresponding editor object which controls the placement, movement, and connection to the component. A standard interface (CEditor) to the editor object is provided. The CEditor object provides a standard mechanism (1) for displaying the available ports and the current connections, (2) for selecting an available port, (3) for connecting a port to another port, and (4) for moving the component. The implementor of a component preferably implements an editor object that inherits the CEditor interface. When a programmer selects a component, the programming system instantiates both the run-time object and an editor object for the component.

Figure 8:
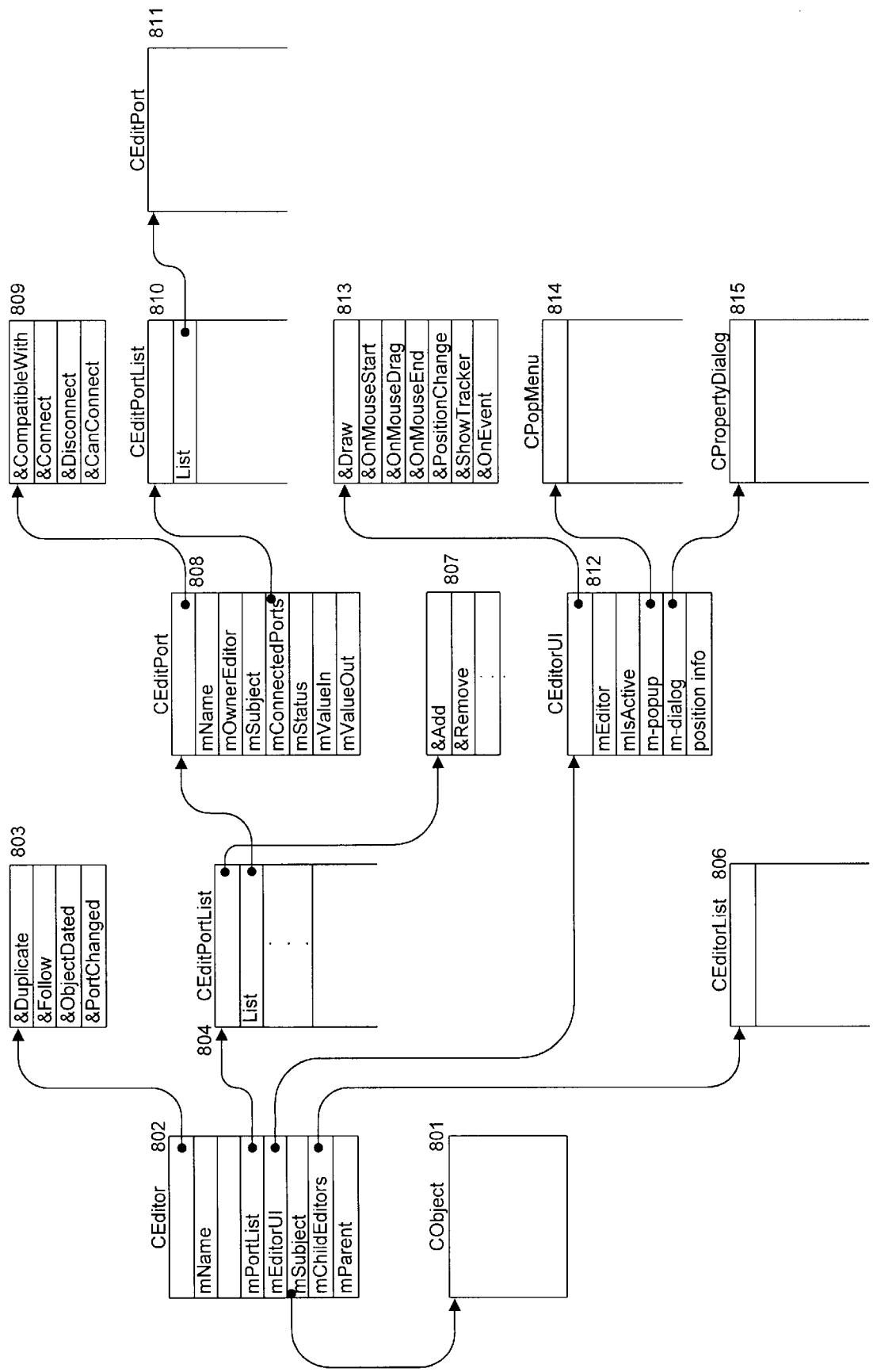
FIG. 8 is a block diagram of data structures of a CEditor object.

FIG. 8 is a block diagram of data structures of a CEditor object. The CEditor object 802 contains a pointer to a list of available ports (mPortList), a pointer to a user interface editor object (mEditorUI), a pointer to the run-time object corresponding to the component (mSubject) , a pointer to a list of child editor object (mChildEditors), and a pointer to a parent editor (mParent). Each port is described by a CEditPort object 808. A CEditPort object contains a pointer to the associated CEditor object (mOwnerEditor), a pointer to a list of input ports to which the port is connected (mConnectedPorts), status information (mStatus), and pointer to member functions identifying the input and output portions of the port (mValueIn and mValueOut) as pointers to member functions. The CEditorUI object 812 contains member functions to control moving the component on the display and displaying available ports and connections.

A component may contains child components. For example, a window component (parent component) may contain a scroll bar component. The CEditor object for the window contains pointers to each child CEditor object.

The visual programming environment tracks the first level of parent components. Each CEditor object tracks its child CEditor objects. When an event occurs (e.g. mouse button down), the programming environment passes the event to the appropriate first level component. The first level component is responsible to passing the event on the appropriate child component.

Code Table 4 is pseudocode for the class CEditor. The CEditor class inherits the CObject class. This inheritance allows connections between CEditor objects to be controlled by the connection manager. The CEditor objects are, thus, connected in a manner similar to the way the run-time objects are connected. The CEditor object includes a constructor and member function to delete an object.

CODE TABLE 4

```
class CEditor:    public CObject
{
public:
                CEditor(CEditor* pEditor, CObject* pSubject);
                virtual VOID ObjectDeleted(CObject* object);
                virtual VOID PortChanged(CEditPort* port);
                VString mName;
private:
                CEditPortListPtr mPortList;
                CEditorUIPtr mEditorUI;
                CObjectPtr mSubject;
                CEditorListPtr mChildEditors;
                CEditorPtr mParent;
};
VOID        CEditor::ObjectDeleted(CObject* object)
{
        for each CEditPort port1 in mPortList
            if (port1 is connected)
                for each CEditPort port2 in mConnectedPorts of port1
                    if (port2.mSubject == object)
                        port1->Disconnect(port2)
        RemoveTarget(object);
        mSubject->RemoveTarget(object);
        for each CEditorUI eui in mEditorUIList
            eui->RemoveTarget(object);
};
```

Code Table 5 contains pseudocode defining CEditorUI class. The CEditorUI class provides a standard mechanism for editing connections between components and movement of components. When a programmer selects to add a component to a visual program, the programming system instantiates the object, an CEditorUI for the object, and a CEditor object for the object. In a preferred embodiment, the programmer can move a component by clicking on the component. A tracker box is drawn and the user can then drag the component to a new position.

CODE TABLE 5

```
class CEditorUI: public CObject, CWindow
{
public:
    virtual void        Draw(const VRect& rectUpdate);
    virtual BOOL        OnMouseStart(CUserEvp *, VPoint, INT,
                        INT);
    virtual BOOL        OnMouseDrag(CUserEvp *, VPoint, BOOL);
    virtual BOOL        OnMouseEnd(CUserEvp *, VPoint, BOOL);
    virtual void        PositionChange();
    BOOL showTracker;
    VPoint startSize;
    VPoint startPoint;
    WORD dragMode;
    virtual BOOL        MakeStdUI(CEditor*, CWindow*);
    virtual BOOL        NotifyEvent(CEvent* ev,
```

CODE TABLE 5-continued

```
                        CObject* sender,
                        ULONG action);
    CPopMenuPtr         m_popup;
    CPropertyDialogPtr  m_dialog;
private:
    CEditorPtr          mEditor;
    BOOL                mIsActive;
};
```

The programming system invokes the member function Draw to request the component to draw a tracker box. The programming system invokes the member function OnMouseStart to indicate that object is being selected, the member function OnMouseDrag to indicate the new position of the tracker, and the member function OnMouseEnd to indicate that the tracking is complete. The member function OnMouseEnd invokes the member function PositionChange to pass the new position to the CEditorUI object that is specific to the component (e.g., scroll bar).

The member function MakeStdUI initializes a standard user interface for the component. The standard user interface includes a menu for selecting to delete the component, to move or size the component, or to change properties of the component. The CEditorUI provides a standard dialog for displaying available ports and current connections. For example, a list of available ports would be

| Name | Type | Input Member | Output Member |
|---|---|---|---|
| Position | CIntEvent | 6 | 7 |
| Pageup | CActionEvent | 11 | 12 |

Code Table 6 contains pseudocode describing the CEditPort class. This class provides member functions to manage the actual connection between components. When two ports are selected for connection, the programming system invokes the member function Connect of the output port passing the input port. The member function Connect adds the target object to the connection array of the source object and adds the input port to the list of connections for the editor object.

CODE TABLE 6

```
class CEditPort:   public CObject
{
public:
            virtual       Connect(CEditPort*
            BOOL          OtherPort);
            virtual       Disconnect(CEditPort*
            BOOL          OtherPort);
private:
            VString         mName;
            CEditorPtr      mOwnerEditor;
            CObjectPtr      mSubject;
            CEditPortListPtr mConnectedPorts;

BOOL            mIsConnected : 1;
            BOOL            mIsOutput : 1;
            BOOL            mIsInput : 1;
            BOOL            mCanRead : 1;
            BOOL            mCanWrite : 1;

CObjectPtr      mValueIn;
            CObjectPtr      mValueOut;
};
BOOL        CEditPort::Connect(CEditPort*
```

CODE TABLE 6-continued

```
        OtherPort)
{
        mSubject->AddTarget(
            Otherport->mSubject,
            OtherPort->MValueIn,
            this->MValueOut);
        mIsConnected = TRUE;
        mConnectedPorts->Add(OtherPort);
        return TRUE;
}
```

Code Table 7 contains pseudocode for an implementation of the CEditor class for a scroll bar component. The implementation provides a constructor for the CEScrollBar class that inherits the CEditor class.

The Constructor instantiates a CEditPort object for each port for the scroll bar component. In this example, the ports are "value" and "LineUp." The port value is a bidirectional port, that is, the member function value can be connected to an input and output port. The constructor also creates a CEScrollBarUI object. Code Table 8 contains pseudocode for the EScrollBarUI class.

CODE TABLE 7

```
class CEScrollBar : CEditor
{    CEScrollBar(CEditor* pParentEditor,
        CWindow* pParentWindow,
        CObject* pSubject);
};

CEScrollBar::CEScrollBar(CEditor* pParentEditor,
        CWindow* pParentWindow,
        CObject* pSubject)
            : CEditor(pParentEditor, pSubject)
{
    CEditPort* pp;
    void (CScrollBar::*mfp3)();
    name(**);

{
        INT (CScrollBar::*mfp1)()    = &CScrollBar::value;
        void (CScrollBar::*mfp2)(INT)    = &CScrollBar::value;
        pp = new CNumEditPort(this, "Value");
        pp->isOutput(TRUE);
        pp->valueOut( (CObject*)MemberToLong( mfp1 ) );

pp->isInput(TRUE);
        pp->valueIn( (CObject*)MemberToLong( mfp2 ) );
        pp->canRead(TRUE);
        pp->canWrite(TRUE);

portList()->Add(pp);
    }
    pp = new CEditPort(this, "Line Up");
    pp->isInput(TRUE);
    pp->valueIn( (CObject*)MemberToLong( mfp3 =
    &CScrollBar::lineUp ) );
    portList()->Add(pp);

CEScrollBarUI* ui = new CEScrollBarUI(this,
    pParentWindow);
    editorUIList( new CEditorUIList );
    editorUIList()->Add( ui );
}
```

CODE TABLE 8

```
class CEScrollBarUI:CEditorUI
{CEScrollBarUI(CEditor*, CWindow*)}
CEScrollBarUI::CBScrollBarUI(    CEditor* pEditor,
                                  CWindow* pParentWindow)
```

CODE TABLE 8-continued

```
{
    editor(pEditor);
    parent(pParentWindow);

CObject* po = editor()->subject();
    position( ((CWindow*)po)->position() );

MakeStdUI(pEditor, pParentWindow);
}
```

Figure 9:
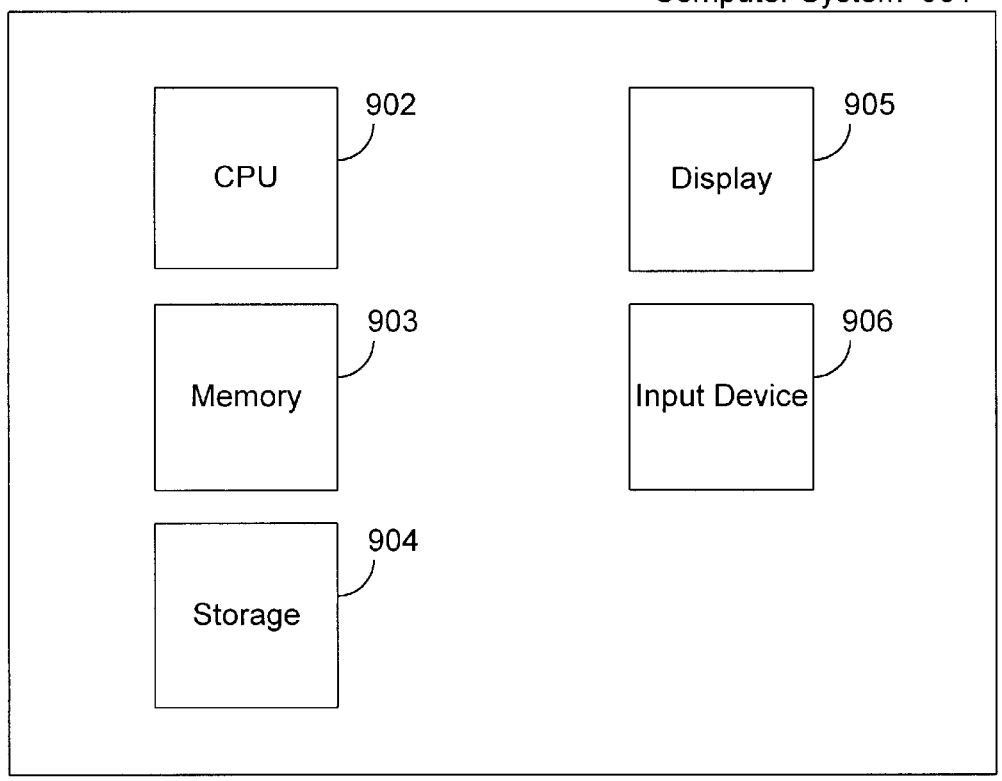
FIG. 9 is a block diagram of a computer system.

FIG. 9 is a block diagram illustrating a computer system for implementing the present invention. The computer system 901 includes central processing unit 902, memory 903, storage 904, display 905, and input device 906. In a preferred embodiment, objects are instantiated in memory and persistently stored to storage. Visual programs output data to the display and input data from the input device.

Although the present invention has been described in terms of a preferred embodiment, it is not intended that the invention be limited to this embodiment. Modifications within the spirit of the invention will be apparent to those skilled in the art. The scope of the present invention is defined by the claims which follow.

I claim:

1. A method in a computer system of persistently storing objects implementing the behavior of a visual program in secondary storage, the computer system having a central processing unit and a main memory, the main memory having memory locations, each memory location having a memory address, each object being an instance of a class and having a memory address that uniquely identifies the object, the method including the steps of:

when storing the visual program in secondary storage,
  storing in secondary storage the memory address of each object; and
  for each object, storing in secondary storage an internal state of the object and the memory address of each target object to which the object is connected; and when retrieving the visual program from secondary storage,
  retrieving from secondary storage the memory address of each object;
  for each object,
    instantiating an object of the retrieved class within the main memory, the instantiated object having a new memory address; and
    mapping the retrieved memory address to the new memory address for the instantiated object; and
  for each instantiated object,
    retrieving from secondary storage the internal state and the memory address of the target objects to which the object is connected;
    determining from the mapping the new memory address corresponding to the retrieved memory address of each target object; and
    storing the determined new memory addresses in the instantiated object.

2. The method of claim 1 wherein the internal state includes a pointer to a member function of each target object to which a source object is connected.

3. A method in a computer system for persistently storing a plurality of connected objects in secondary storage, the computer system having a central processing unit and a main memory, the main memory being directly accessible by the central processing unit, the main memory having memory locations, each memory location having a memory address, each object having an object class and being instantiated in main memory of the computer system, each object having a memory address that uniquely identifies the instantiated object within main memory, each object containing the memory address of each target object to which it is connected, the method comprising:

when storing the objects in secondary storage,
    for each object,
      writing to secondary storage the memory address of the object and the memory address of each target object to which the object is connected; and
  when retrieving the objects from secondary storage,
    for each object,
      reading from secondary storage the memory address of the object;
      instantiating the object in the main memory of the computer system, the instantiated object having a new memory address;
      reading from secondary storages the memory address of each target object to which the object is connected; and
      mapping the read memory address of each target object to which the object is connected to the new memory address for that target object so that the instantiated object is connected to the instantiated target object.

4. The method of claim 3 wherein each target object has a plurality of member functions and when writing to secondary storage, writing an indication of one of the plurality of member functions for each target object and when reading from secondary storage, reading an indication of the member function for each target object.

5. A computer-readable medium containing instructions for causing a computer system to persistently store a plurality of connected objects in secondary storage, the computer system having a central processing unit and a main memory, the main memory having memory locations, each memory location having a memory address, each object having an object class and being instantiated in main memory of the computer system, each object having a memory address that uniquely identifies the instantiated object within main memory, each object containing the memory address of each target object to which it is connected, by a method comprising:

when storing the objects in secondary storage,
    for each object,
      writing to secondary storage the memory address of the object and the memory addresses of each target object to which the object is connected; and
  when retrieving the objects from secondary storage,
    for each object,
      reading from secondary storage the memory address of the object;
      instantiating the object in the main memory of the computer system, the instantiated object having a new memory address;
      reading from secondary storage the memory address of each target object to which the object is connected; and
      mapping the read memory address of each target object to which the object is connected to the new memory address for that target object so that the instantiated object is connected to the instantiated target object.

6. The computer-readable medium of claim 5 wherein each target object has a plurality of member functions and when writing to secondary storage, writing an indication of one of the plurality of member functions for each target object and when reading from secondary storage, reading an indication of the member function for each target object.

7. A computer-readable medium containing instructions for causing a computer system to persistently store objects implementing the behavior of a visual program in secondary storage, the computer system having a central processing unit and a main memory, the main memory having memory locations, each memory location having a memory address, each object being an instance of a class and having a memory address that uniquely identifies the object, by a method comprising:

when storing the visual program in secondary storage,
    storing in secondary storage the memory address of each object; and
    for each object, storing in secondary storage an internal state of the object and the memory address of each target object to which the object is connected; and
  when retrieving the visual program from secondary storage,
    retrieving from secondary storage the memory address of each object;
    for each object,
      instantiating an object of the retrieved class within the main memory, the instantiated object having a new memory address; and
      mapping the retrieved memory address to the new memory address for the instantiated object; and
    for each instantiated object,
      retrieving from secondary storage the internal state and the memory address of the target objects to which the object is connected;
      determining from the mapping the new memory address corresponding to the retrieved memory address of each target object; and
      storing the determined new memory addresses in the instantiated object.

\* \* \* \* \*